(12) United States Patent
Bell et al.

(10) Patent No.: US 7,415,335 B2
(45) Date of Patent: Aug. 19, 2008

(54) MOBILE DATA COLLECTION AND PROCESSING SYSTEM AND METHODS

(75) Inventors: David Monroe Bell, Palm Bay, FL (US); Timothy Raymond Culp, Melbourne, FL (US); John Bryan Daly, Melbourne Village, FL (US); Michael Hattermann, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 358 days.

(21) Appl. No.: 10/719,203

(22) Filed: Nov. 21, 2003

(65) Prior Publication Data

US 2005/0113994 A1 May 26, 2005

(51) Int. Cl.
*G01M 17/00* (2006.01)
*G06F 19/00* (2006.01)

(52) U.S. Cl. .......................... 701/35; 701/67; 701/209; 340/438; 396/20

(58) Field of Classification Search .................. 340/988, 340/425.5, 426.19, 426.23, 500, 815.4, 995, 340/438; 352/244; 345/7; 701/67, 1, 23, 701/25, 28, 35, 36, 65, 200, 207, 211, 213, 701/220, 300, 209; 455/414.1; 348/E7.06, 348/36, 206–207, 14; 396/20
See application file for complete search history.

(56) References Cited

U.S. PATENT DOCUMENTS

| | | | |
|---|---|---|---|
| 5,214,757 A | | 5/1993 | Mauney et al. ............... 395/161 |
| 5,488,478 A | * | 1/1996 | Bullock et al. .............. 356/604 |
| 5,517,419 A | * | 5/1996 | Lanckton et al. ............ 701/216 |
| 5,620,519 A | * | 4/1997 | Affeldt et al. ............... 118/669 |
| 5,675,489 A | * | 10/1997 | Pomerleau ................... 701/28 |
| 5,995,650 A | * | 11/1999 | Migdal et al. ............... 382/154 |
| 6,243,131 B1 | * | 6/2001 | Martin ......................... 348/36 |
| 6,359,837 B1 | * | 3/2002 | Tsukamoto ................... 368/10 |
| 6,473,678 B1 | * | 10/2002 | Satoh et al. ................... 701/41 |
| 6,747,686 B1 | * | 6/2004 | Bennett ...................... 348/145 |
| 6,753,902 B1 | * | 6/2004 | Kashiwazaki ............... 348/119 |
| 6,760,106 B2 | * | 7/2004 | Carroll ........................ 356/328 |

(Continued)

FOREIGN PATENT DOCUMENTS

CN 1677167 A * 10/2005

(Continued)

OTHER PUBLICATIONS

Kiyotaka Hirahara et al., Detection of street-parking vehicles using line scan camera and scanning larser range sensor, IEEE Trans. 2003, pp. 656-661.*

(Continued)

*Primary Examiner*—Cuong H Nguyen
(74) *Attorney, Agent, or Firm*—Allen Dyer Doppelt Milbrath & Gilchrist

(57) ABSTRACT

The mobile data collection system includes a positioning system, such as a Global Positioning System (GPS) receiver and/or an Inertial Navigation System (INS), to generate position and time data. A down looking line scan camera for mounting on a vehicle, obtains a series of line scan images of a path, such as a road. A data collection controller is connected to the positioning system and the line scan camera to associate the line scan images with the corresponding position and time data. A database stores the line scan images and associated corresponding position and time data. An image processor identifies and marks features in the line scan images.

25 Claims, 2 Drawing Sheets

U.S. PATENT DOCUMENTS

| | | | |
|---|---|---|---|
| 6,766,038 B1 * | 7/2004 | Sakuma et al. | 382/107 |
| 6,837,432 B2 * | 1/2005 | Tsikos et al. | 235/462.01 |
| 6,996,255 B2 * | 2/2006 | Sakuma et al. | 382/107 |
| 7,136,726 B2 * | 11/2006 | Greenfeld et al. | 701/3 |
| 7,324,681 B2 * | 1/2008 | Chang et al. | 382/141 |
| 7,384,193 B2 * | 6/2008 | Eliasson | 378/207 |
| 2001/0056326 A1 * | 12/2001 | Kimura | 701/208 |
| 2002/0122114 A1 * | 9/2002 | Carroll | 348/144 |
| 2002/0167589 A1 * | 11/2002 | Schofield et al. | 348/148 |
| 2003/0003899 A1 * | 1/2003 | Tashiro et al. | 455/414 |
| 2003/0048271 A1 * | 3/2003 | Liess et al. | 345/428 |
| 2003/0072471 A1 * | 4/2003 | Otsuka et al. | 382/103 |
| 2003/0122930 A1 * | 7/2003 | Schofield et al. | 348/148 |
| 2003/0222987 A1 * | 12/2003 | Karazuba | 348/207.99 |
| 2004/0005080 A1 * | 1/2004 | Hayduchok | 382/101 |
| 2004/0032531 A1 * | 2/2004 | Mercier | 348/584 |
| 2004/0032581 A1 * | 2/2004 | Nikoonahad et al. | 356/237.2 |
| 2004/0167709 A1 * | 8/2004 | Smitherman et al. | 701/208 |
| 2005/0113994 A1 * | 5/2005 | Bell et al. | 701/35 |

FOREIGN PATENT DOCUMENTS

| | | | |
|---|---|---|---|
| EP | 597639 A1 * | 5/1994 | |
| JP | 2003284000 A * | 10/2003 | |
| JP | 2006270768 A * | 10/2006 | |
| WO | WO 9316353 A1 * | 8/1993 | |
| WO | 627069 B1 * | 11/1996 | |

OTHER PUBLICATIONS

J. Canny, A computation approach to edge detection, IEEE Trans. on Pattern Analysis and Machine Intelligent, 8(6), pp. 679-698, 1986.*

Optical phased array technology, McManamon, P.F.; Dorschner, T.A.; Corkum, D.L.; Friedman, L.J.; Hobbs, D.S.; Holz, M.; Liberman, S.; Nguyen, H.Q.; Resler, D.P.; Sharp, R.C.; Watson, E.A.; Proceedings of the IEEE, vol. 84, Issue 2, Feb. 1996 pp. 268-298, Digital Object Identifier 10.1109/5.482231.*

Street-parking vehicle detection using line scan camera, Zhu, C.H.; Hirahara, K.; Ikeuchi, K.; Intelligent Vehicles Symposium, 2003. Proceedings. IEEE, Jun. 9-11, 2003 pp. 575-580, Digital Object Identifier 10.1109/IVS.2003.1212976.*

Detection of vehicles in panoramic range image, Hirahara, K.; Ikeuchi, K.; Robotics and Automation, 2004. Proceedings. ICRA '04. 2004 IEEE International Conference on, vol. 1, 2004 pp. 84-89 vol. 1, Digital Object Identifier 10.1109/ROBOT.2004.1307133.*

3D building facade model reconstruction using parallel images acquired by line scan cameras, Kataoka, K.; Osawa, T.; Ozawa, S.; Wakabayashi, K.; Arakawa, K.; Image Processing, 2005. ICIP 2005. IEEE International Conference on, vol. 1, Sep. 11-14, 2005 pp. I-1009-I-1012, Digital Object Identifier 10.1109/ICIP.2005. 1529924.*

Using densely recorded scenes for place recognition; Tat-Jun Chin,; Hanlin Goh,; Joo-Hwee Lim,; Acoustics, Speech and Signal Processing, 2008. ICASSP 2008. IEEE International Conference on; Mar. 31, 2008-Apr. 4, 2008 pp. 2101-2104 Digital Object Identifier 10.1109/ICASSP.2008.4518056.*

Subpixel edge detection and estimation with a microprocessor-controlled line scan camera; Li, Y.-S.; Young, T.Y.; Magerl, J.A.; Industrial Electronics, IEEE Transactions on; vol. 35, Issue 1, Feb. 1988 pp. 105-112; Digital Object Identifier 10.1109/41.3072.*

Noncontact measurement using line-scan cameras: Analysis of positioning error; Li, Y.-S.; Young, T.Y.; Huang, C.-C.; Industrial Electronics, IEEE Transactions on; vol. 36, Issue 4, Nov. 1989 pp. 545-551; Digital Object Identifier 10.1109/41.43014.*

Position detection using stereo slit camera and vertical objects; Takayasu, N.; Aoki, M.; Intelligent Vehicles Symposium, 2004 IEEE; Jun. 14-17, 2004 pp. 762-767; Digital Object Identifier 10.1109/IVS. 2004.1336480.*

Machine vision technology take-up in industrial applications; Soini, A.; Image and Signal Processing and Analysis, 2001. ISPA 2001. Proceedings of the 2nd International Symposium on; Jun. 19-21, 2001 pp. 332-338; Digital Object Identifier 10.1109/ISPA.2001. 938651.*

Machine vision system for color sorting wood edge-glued panel parts;Lu, Q.; Srikanteswara, S.; King, W.; Drayer, T.; Conners, R.; Kline, E.; Araman, P.; Industrial Electronics, Control and Instrumentation, 1997. IECON 97. 23rd International Conference on vol. 3, Nov. 9-14, 1997 pp. 1460-1464 vol. 3; Digital Object Identifier 10.1109/IECON.19.*

Multisensorial cameras in industrial quality inspection; Massen, R.; Advanced Technologies, Intelligent Vision, 1995. AT'95☐☐Oct. 6, 1995 pp. 23-26; Digital Object Identifier 10.1109/AT.1995.535971.*

Surface-micromachined Mirrors For Laser-beam Positioning; Tien, N.C.; Solgaard, O.; Kiang, M-H.; Daneman, M.; Lau, K.Y.; Muller, R.S.; Solid-State Sensors and Actuators, 1995 and Eurosensors IX. Transducers '95. The 8th International Conference on; vol. 2, Jun. 25-29, 1995 pp. 352-355.*

Gilliéron et al., "Development of a Low Cost Mobile Mapping System for Road Data Base Management" Jul. 9, 2000, 3rd Int'l Symposium on Mobile Mapping Technology; pp. 1-12.

U.S. Census Bureau, Geography Division, Background Information on the MAF/TIGER Accuracy Improvement Project (MTAIP) and Governmental Partnerships; created Jan. 2, 2003; pp. 1-2.

U.S. Census Bureau, "MAF/TIGER Accuracy Improvement Project", created Feb. 13, 2001; pp. 1-2.

R. Garceau—Harris Corporation, "MAF/TIGER®—Master Address File/Topologically Integrated Geographic Encoding and Referencing", Jun. 17, 2003.

Center for Mapping GPS Van Project, "GPSVan™ Project" updated on May 9, 1996.

Ellum et al., "Land-Based Mobile Mapping Systems", published by Photogrammetric Engineering & Remote Sensing, Jan. 2002; pp. 13, 15-17 and 28.

* cited by examiner

MOBILE DATA COLLECTION AND PROCESSING SYSTEM AND METHODS

FIELD OF THE INVENTION

The present invention relates to the field of data collection, and, more particularly, to mobile mapping systems and road database management and related methods.

BACKGROUND OF THE INVENTION

Accurate position of roads is useful in many commercial and government applications ranging from real time vehicle navigation systems to the definition of boundaries (congressional, municipal, voting districts).

The MAF, or Master Address File, is designed to be a complete and current list of all addresses and locations where people live or work, covering an estimated 115 million residences, as well as 60 million businesses and other structures in the United States. TIGER®, or Topologically Integrated Geographic Encoding and Referencing data is a digital database that identifies the type, location and name of streets, rivers, railroads and other geographic features, and geospatially defines their relationships to each other, to the MAF addresses, and to numerous other entities. The two databases are maintained by the U.S. Census Bureau's Geography Division.

The MAF/TIGER Accuracy Improvement Program (MTAIP) is a major improvement to the quality and accuracy of the Census Bureau's digital geographic data which will be used by U.S. census takers in 2010 and beyond. The program will enable census takers to more precisely conduct their research and tabulations, and will ultimately result in an advanced, easy to update digital database that accurately reflects all of the nation's geographic census data. The MTAIP has a requirement to collect road centerlines at sufficient horizontal accuracy to support a final deliverable product of 5 meters (CE95).

Roughly 1/3 of all counties in the contiguous United States will require centerline collection. With over 11.3M kilometers of roads, the MTAIP will be collecting about 3.7M kilometers of centerline information. Assuming an average collection speed of 15 mph, there will be over 155,000 hours of collection time. Currently it is estimated that for every hour of collection time, another hour of post processing will be spent refining the data to meet the 5 m requirement. The labor costs could be approximately $18M over the lifetime of the program. Any automation that can be applied to reduce the touched labor costs will have a dramatic impact on the overall cost of the program. There are several commercial and government programs that are gathering centerline road data, but not to the scale or accuracy required by the Census Bureau.

The most common approach is to outfit a van with a Global Positioning System (GPS) receiver (combined with Inertial Navigation System (INS) for dead reckoning), drive the roads, and ignore the differences between the van location and the centerline. This approach does not meet the 5 m requirement for roads with more than 2 lanes. A second approach is to drive the roads twice (once in each direction), average the 2 collections, and ignore errors introduced by lane changes. This approach is cost prohibitive for the number of roads MTAIP is collecting. A third approach is to record lane changes during the collection, and apply an average lane width offset to the van location as a post-processing step. This approach requires a high level of attention on the part of the operator to reduce human-induced error (2% error means 46,500 miles potentially outside of the 5 m specification).

An example of a mobile mapping and data collection system that can map rail, highway and the transportation infrastructure (e.g., roads, signs, and bridges) while traveling at normal traffic speed is the GPSVan™ developed by the Center for Mapping at the Ohio State University. A Mobile Mapping System (MMS) can be defined as a moving platform, upon which multiple sensor/measurement systems have been integrated, to provide three-dimensional, near-continuous positioning of both the platform and simultaneously collected geo-spatial data. The Center for Mapping developed this technology, realizing that Geographic Information Systems (GIS) require up-to-date and high-quality spatial data to enhance the decision making process in transportation and urban planning. The GPSVan™ positioning module integrates the Global Positioning System (GPS) in the differential mode, and an independent Dead-Reckoning System (DRS) that records the vehicle's position during temporary GPS data outages (satellite signal blockage by trees or other obstructions). The positioning of the vehicle is good to 10 cm when GPS data is available at three-second intervals. GPS data outages of 30 s, 60 s and 120 s cause the positioning degradation to the level of 0.2 m, 0.4 m and 1.0 m, respectively. Additional attributes, i.e., road signs, bridges, etc., can be recorded by a system operator, using a PC keyboard, or the touch screen of the system's portable computer.

An imaging module of the GPSVan™ includes a stereo camera system that records stereo images of the roadway as the van moves down the highway. The stereo system is supplemented by an analog camera system that runs in continuous video mode, and captures a photographic log of the survey. Each video frame is time-tagged with the GPS signal, and geodetic coordinates (i.e., latitude, longitude and ellipsoidal height) are assigned to every image. Digital stereo pairs are processed in a post-mission mode to determine geodetic coordinates of objects such as road edges and centerlines, curbs, street signs, mile markers, etc., with a relative accuracy of 5-10 centimeters within 10-40 meters from the vehicle. The analog imagery provides information for urban planners and tax assessors, as well as the real estate and transportation industry. Data collected by the GPSVan™ can be converted into a format compatible with a GIS, and used by the rail and transportation authorities to establish management priorities, and control safety features, such as speed limits and location of the warning signs.

Similar to the Ohio State GPSVan™, LambdaTech and Transmap use forward and/or side looking stereo cameras coupled with GPS navigational equipment to map road features. Another company using similar features is Visat. One survey article is "Land Based Mobile Mapping Systems" by Cameron Ellum and Nase El-Sheimy published in Photogrammetric Engineering & Remote Sensing for January 2002. Also, a Swedish system called the PhotoBus is documented by Gillieron et al. in the $3^{rd}$ International Symposium on Mobile Mapping Technology. The Photobus system performs a survey of the painted road centerline using a GPS and a Charge-Coupled Device (CCD) camera mounted on a roof rack extending over the left side of the vehicle. The image footprint is about 2.8 meters long and 2 meters wide.

SUMMARY OF THE INVENTION

In view of the foregoing background, it is therefore an object of the present invention to provide a more accurate mobile data collection system and method that can operate at higher speeds.

This and other objects, features, and advantages in accordance with the present invention are provided by a mobile data collection system including a positioning system to generate position and time data, and a down-looking line scan camera for mounting on a vehicle to obtain a series of line scan images of a path, such as a road. A data collection controller is connected to both the positioning system and the line scan camera to associate the line scan images with the corresponding position and time data.

The mobile data collection system may also include a database to store the line scan images and associated corresponding position and time data. Furthermore, the positioning system preferably includes a Global Positioning System (GPS) receiver and an Inertial Navigation System (INS). The system may use GPS in the differential mode for increased accuracy. The line scan camera may include a one-hundred-and-eighty degree fish-eye lens, and the data collection controller may include a central processing unit and a frame grabber. A display device may be connected to the data collection controller to display the line scan images, and the data collection controller may include an image processor to identify and mark road features, such as road edges, lane markings and the centerline, in the line scan images.

Objects, features, and advantages in accordance with the present invention are also provided by a method for road-centerline data collection and processing including providing a positioning system in a vehicle to generate position and time data, mounting a down-looking line scan camera with a wide-angle lens on the vehicle, and moving the vehicle along a road and operating the line scan camera to obtain a series of line scan images of the road. Each line scan image is associated with corresponding position and time data from the positioning system, and the line scan images may be displayed and/or processed to identify and mark road features.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
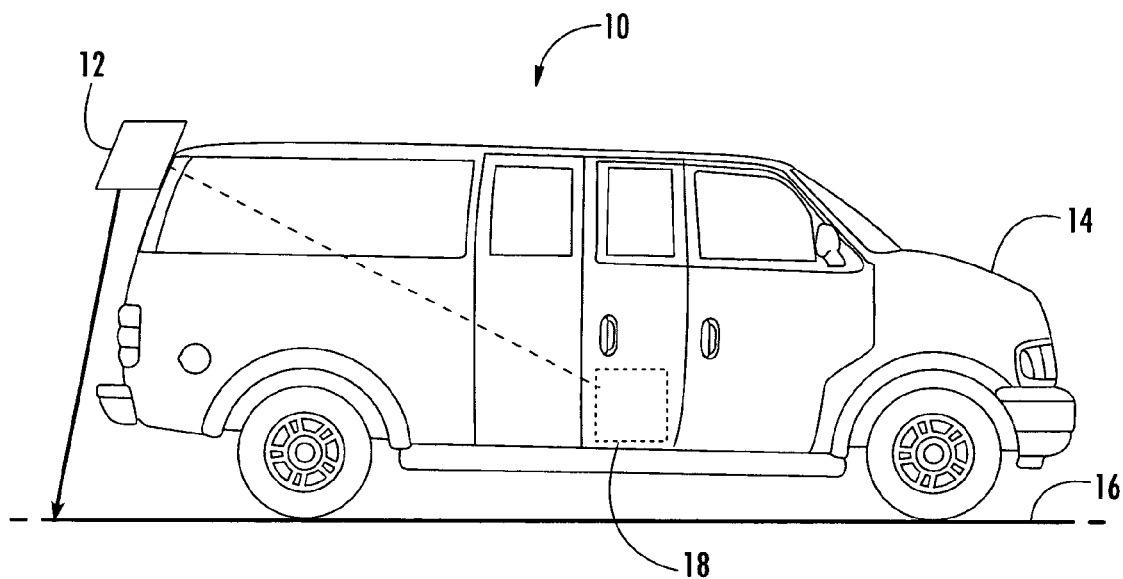
FIG. 1 is a schematic diagram of a mobile data collection system including a line scan camera in accordance with the present invention.
Figure 2:
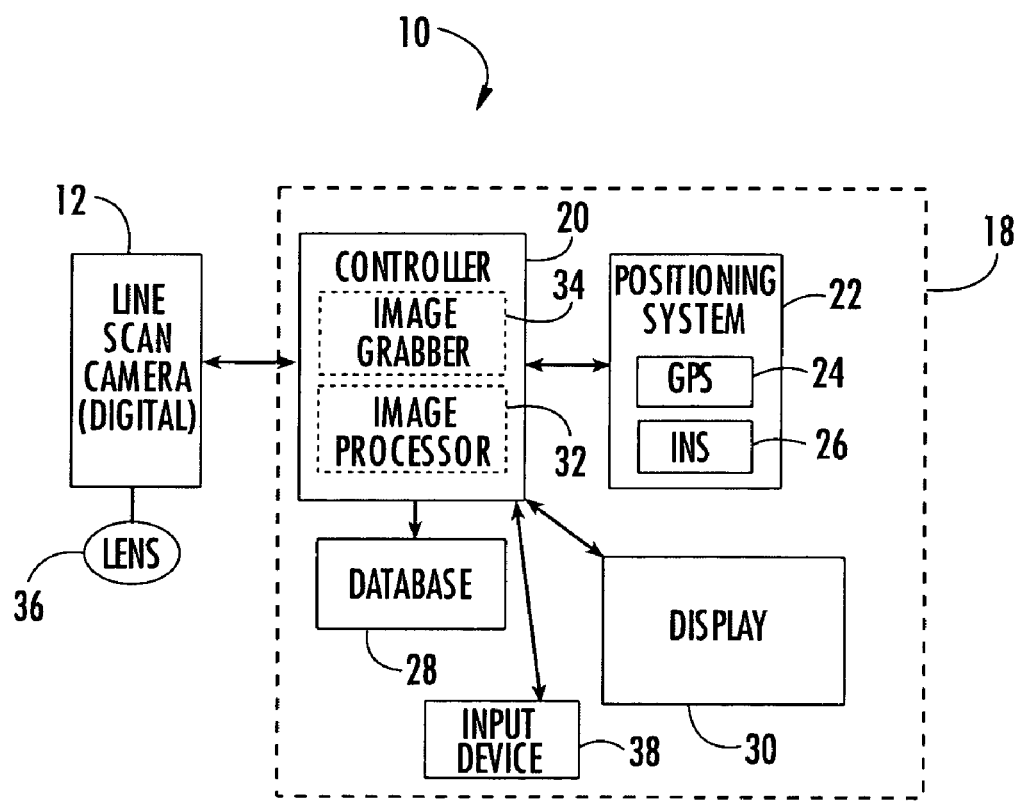
FIG. 2 is a more detailed schematic diagram of the mobile data collection system of the present invention.

With reference to FIGS. 1 and 2, a mobile data collection system 10 in accordance with the present invention will be described. The system 10 includes a positioning/navigational system 22 to generate position and time data, and a down-looking line scan camera 12, for mounting on a vehicle 14 to obtain a series of line scan images of a path 16, such as a road. The camera may be a Spark SP-14 black and white line scan camera, for example, available from Dalsa of Waterloo, Ontario, Canada.

The down-looking line scan (also known as a broom sweep because of the way it "sweeps" to form an image) camera 12 scans across the path 16 as the vehicle 14 travels. The line scan camera 12 can be fitted with various lenses. An example is a combination of the line scan camera 12 and a 180 degree fish-eye lens 36, but other combinations are possible. Another possible design is to use two or more line scan cameras 12 angled so as to obtain higher resolution images of as wide a field as required. It would even be possible to scan upwards to capture details of overhead road structures. Advantages are that because the camera 12 takes images a single scan at a time the vehicle 14 can travel at higher speeds and collect a smaller volume of data than systems which use an area scan camera.

A line scan camera includes a CCD element, lens & driver control circuit. An image of an object, created on the CCD element via the lens, and quantity of light is converted to a video pulse signal and then is output. The resolution of a line scan camera is approximately 10 times ($10^2$ times in two dimensions) higher than an area camera. A typical line scan camera can scan at 20 MHz (50 nsec/scan). Image capture speed by a line scan camera is considerably faster than the typical speed of an area camera. Also, in the inspection of a continuous object, e.g. the roadway, it's difficult to get synchronization with an area camera. However, continuous processing is more easily done with a line scan camera because of its video output of each scan.

The positioning system 22 preferably includes a Global Positioning System (GPS) receiver 24 and may also include an Inertial Navigation System (INS) 26 for obtaining positional data in areas where obstruction of GPS signals may occur. The system may use the GPS in the differential mode for increased accuracy, as would be appreciated by the skilled artisan. A data collection controller 20 is connected to the positioning system 22 and the line scan camera 12 to associate each line scan image with corresponding position and time data. In other words, each scan line is tagged with geospatial and time data. Imagery may be collected based on the vehicle 14 velocity. Scans may be collected at a lower linear resolution at higher speeds because the road position is unlikely to be changing rapidly.

The mobile data collection system 10 may also include a database 28 to store the line scan images and associated corresponding position and time data. Typically, the data collection controller 20 would include a central processing unit and a frame grabber 34. A display device 30, e.g. a touch screen monitor, may be connected to the data collection controller 20 to display the line scan images. Also, an input device 38, such as a keyboard, mouse, microphone etc., may be associated with the data collection controller 20 and the display device 30. And, in connection therewith, the data collection controller 20 may include an image processor 32 to identify and mark road features, such as road edges, lane markings, road centerline, bridges, railroad crossings and overpasses, in the line scan images. For example, contrast filters/feature detection techniques may be used to track the centerline. An operator may seed a program by dropping points on the centerline. The operator may then re-seed the program when it loses confidence as would be appreciated by the skilled artisan. Imagery can be unrectified (image space), rectified in 1D (to remove lens curvature), rectified in 2D (ground space) or rectified in 3D (if multiple cameras are used, a three dimensional model of the drive path can be created).

A method aspect of the invention is directed to a method for road-centerline data collection and processing. The method includes providing the positioning system 22 in the vehicle 14 to generate position and time data, mounting the down-looking line scan camera 12 with a wide-angle lens on the vehicle, and moving the vehicle along a road 16 while operating the line scan camera to obtain a series of line scan images of the road. Each line scan image is associated with corresponding position and time data from the positioning system 22, and the line scan images may be displayed and/or processed to identify and mark road features.

By using the down looking line scan camera 12 coupled with the Global Positioning System 24 and Inertial Navigation System 26, one can determine the exact position of points along either the centerline or edges of a roadway 16. Done with sufficient resolution, a highly accurate map of a roadway system can be produced. The line scan camera 12 and navigational equipment 22 is supplemented with software which allows an operator to view the images and mark road features. An advantage of this invention is using image processing to automatically or semi-automatically (i.e. with operator assistance) identify road features such as (but not limited to) road edges and lane markings which can be used to determine the road centerline.

The approach is scalable for the number of roads the MTAIP is required to collect whereas the state of the art approaches are not. Other approaches may not provide a quality assurance check of the data collected whereas, in the present invention, the imagery shows the operator exactly what was collected. Some of the better prior art road centerline collections to date are at about 10 meters (CE95) accuracy, whereas the present invention is closer to about 1 meter (CE95) of accuracy. Thus, the present invention will produce more accurate centerline data with less labor.

The invention has the advantage of being able to use just one camera, whereas the state of the art approaches require a two camera stereo collection. Stereo cameras are required to determine the elevation difference between the location of the collection vehicle and the location of the portion of the road being captured due to the mounting of the cameras (forward looking at a shallow angle). The present invention uses a single line scan camera to capture the portion of the road just in front of or behind the collection vehicle. The elevation of the portion of the road being collected is nearly identical to the elevation of the vehicle, and thus stereo imagery is not required. One drawback to using a single line scan camera is it is not possible to measure the crown or bank of the road directly from the collected data. The effect of road crown and bank has been analyzed and is considered to be acceptably low. However, a laser range finder may used to determine the crown and bank of the road.

The invention also has the ability of being able to view long stretches of road on a small computer screen without losing the ability to measure orthogonal to the road. After 1D rectification, the line scan image has a resolution that is nominally 2 inches in the direction of the road and 2 inches orthogonal to the road. For example, a 500×500 display window will show 1000 inches along the road and 1000 inches orthogonal to the road. The image viewer developed permits adjustment of the viewing resolution independently in each of the two image directions (along and orthogonal to the road). When the resolution is set to 20 inches along and 2 inches orthogonal to the road, the field of view in a 500×500 display window would be 10,000 inches along the road and 1000 inches orthogonal to the road. The ability to see and measure orthogonal to the road is affected very little. The lines on the road and the edges of the road are still quite visible. This is a distinct advantage in that it allows for a significant reduction in the time required to exploit the image and extract the true centerline of the road because it reduces the number of equivalent screens of data that need to be examined by an operator.

The invention could also be used in other mobile scanning systems, e.g. to scan for condition of roadways and railbeds. In addition to identifying road centerlines, it can be used to accurately identify railroad intersection, start/stop of bridges/tunnels, and other significant road features. If multiple cameras are used, road signs, mile markers, telephone poles and other features located along roadways can also be identified. Products generated from this invention can be used for any system requiring highly accurate centerline data such as the automotive NeverLost systems.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile data collection system for use in a vehicle as it travels along a road, the mobile data collection system comprising:
    a positioning system to generate position and time data as the vehicle travels along the road;
    a down-looking line scan camera mounted on the vehicle and configured to obtain a series of line scan images of the road as the vehicle travels therealong; and
    a data collection controller connected to the positioning system and the line scan camera to associate line scan images with corresponding position and time data as the vehicle travels along the road.

2. The mobile data collection system according to claim 1 further comprising a database to store the line scan images and associated corresponding position and time data.

3. The mobile data collection system according to claim 1 wherein the positioning system comprises a Global Positioning System (GPS) receiver.

4. The mobile data collection system according to claim 3 wherein the positioning system further comprises an Inertial Navigation System (INS).

5. The mobile data collection system according to claim 1 wherein the line scan camera comprises a digital line scan camera and an attached wide-angle lens.

6. The mobile data collection system according to claim 1 wherein the line scan camera comprises an attached fish-eye lens.

7. The mobile data collection system according to claim 1 wherein the data collection controller comprises a central processing unit and a frame grabber.

8. The mobile data collection system according to claim 1 further comprising a display device connected to the data collection controller to display the line scan images.

9. The mobile data collection system according to claim 1 wherein the data collection controller comprises an image processor to identify and mark road features in the line scan images.

10. The mobile data collection system according to claim 1 wherein the image processor identifies road features comprising at least one of road edges, lane markings and centerline.

11. A mobile road-centerline data collection and processing system comprising:
    a vehicle for traveling along a road;
    a positioning system carried by the vehicle to generate position and time data;
    a down-looking line scan camera with an attached wide-angle lens mounted on the vehicle configured to obtain a series of line scan images of the road; and
    a data collection controller, carried by the vehicle and connected to the positioning system and the line scan camera to associate line scan images with corresponding position and time data, the data collection controller comprising an image processor to identify and mark road features in the line scan images.

12. The mobile data collection system according to claim 11 further comprising a database to store the line scan images and associated corresponding position and time data.

13. The mobile data collection system according to claim 11 wherein the positioning system comprises a Global Positioning System (OPS) receiver.

14. The mobile data collection system according to claim 13 wherein the positioning system further comprises an Inertial Navigation System (INS).

15. The mobile data collection system according to claim 11 wherein the line scan camera comprises a digital line scan camera and an attached wide-angle lens.

16. The mobile data collection system according to claim 11 wherein the line scan camera further comprises an attached fish-eye lens.

17. The mobile data collection system according to claim 11 wherein the data collection controller comprises a central processing unit and a frame grabber.

18. The mobile data collection system according to claim 11 further comprising a display device connected to the data collection controller to display the line scan images.

19. A method for road-centerline data collection and processing comprising:

providing a positioning system in a vehicle to generate position and time data as the vehicle travels along a road;

operating a down-looking line scan camera configured to obtain a series of line scan images of the road as the vehicle travels therealong; and associating the line scan images with corresponding position and time data from the positioning system as the vehicle travels along a road.

20. The method according to claim 19 further comprising processing the line scan images to identify and mark road features.

21. The method according to claim 19 further comprising storing the line scan images and associated corresponding position and time data in a database.

22. The method according to claim 19 wherein the line scan camera comprises a digital line scan camera and an attached wide-angle lens.

23. The method according to claim 22 wherein the wide-angle lens comprises a fish-eye lens.

24. The method according to claim 19 wherein associating each line scan image with corresponding position and time data from the positioning system comprises providing a central processing unit and a frame grabber connected to the positioning system and the line scan camera.

25. The method according to claim 19 further comprising connecting a display device to the line scan camera to display the line scan images.

* * * * *